United States Patent [19]

Nakamura et al.

[11] Patent Number: 4,582,357

[45] Date of Patent: Apr. 15, 1986

[54] GUIDE RAIL STRUCTURE FOR AN AUTOMOTIVE SLIDING DOOR

[75] Inventors: Yoshiharu Nakamura, Atsugi; Ryuji Nishimiya, Hiratsuka, both of Japan

[73] Assignees: Nissan Motor Company, Limited, Yokohama; Nissan Shatai Company, Limited, Hiratsuka, both of Japan

[21] Appl. No.: 512,019

[22] Filed: Jul. 8, 1983

[30] Foreign Application Priority Data

Jul. 13, 1982 [JP] Japan ................................ 57-121683

[51] Int. Cl.⁴ ...................... B62D 23/00; B62D 27/02; B60J 5/06
[52] U.S. Cl. .................................... 296/203; 296/209; 296/155; 49/213; 49/225
[58] Field of Search ................... 296/29, 30, 146, 155, 296/186-189, 202-205, 209; 49/213-215, 225

[56] References Cited

U.S. PATENT DOCUMENTS

| | | | |
|---|---|---|---|
| 3,132,891 | 5/1964 | Pyuro et al. | 296/204 |
| 4,307,911 | 12/1981 | Pavlik | 296/188 |
| 4,433,507 | 2/1984 | Chikaraishi | 296/155 |

FOREIGN PATENT DOCUMENTS

| | | | |
|---|---|---|---|
| 0045139 | 2/1982 | European Pat. Off. | |
| 1078454 | 9/1960 | Fed. Rep. of Germany | |
| 6902564 | 1/1969 | Fed. Rep. of Germany | |
| 8013204 | 9/1980 | Fed. Rep. of Germany | |
| 1218104 | 5/1960 | France | |
| 2493792 | 5/1982 | France | |
| 1291478 | 10/1972 | United Kingdom | |
| 2080743 | 2/1982 | United Kingdom | 296/155 |
| 783098 | 11/1980 | U.S.S.R. | 296/204 |

Primary Examiner—Robert B. Reeves
Assistant Examiner—Dennis H. Pedder
Attorney, Agent, or Firm—Schwartz, Jeffery, Schwaab, Mack, Blumenthal & Evans

[57] ABSTRACT

A guide rail structure for an automotive sliding door, particularly applicable for an automotive vehicle having a center pillarless body construction. A guide rail is mounted onto a vehicle body side frame such as roof side frame or side sill. The guide rail has a section extending substantially along the side frame which serves as longitudinal reinforcement and a section inserted into an internal space of the side frame and extending across the internal space. The latter section of the guide rail is supported by a reinforcement which is disposed within the internal space of the side frame and cooperates with the reinforcement to provide lateral reinforcement for the side frame.

4 Claims, 10 Drawing Figures

GUIDE RAIL STRUCTURE FOR AN AUTOMOTIVE SLIDING DOOR

BACKGROUND OF THE INVENTION

The present invention relates generally to a guide rail installation for a sliding door of an automotive vehicle. More specifically, the invention relates to a structure for installing a sliding door guide rail onto a vehicle framework, such as side sill, roof side frame and so forth.

Various constructions of vehicles with sliding doors are known. In general, the sliding door has a slider or roller slidingly engageable with a guide rail installed on the roof side frame, the side sill and so forth for sliding movement. In case of a lower rail engageable with a lower slider or roller of the sliding door, the guide rail is conventionally mounted on the side sill upper panel. Above the side sill upper panel, a step plate is provided in a vertically spaced relationship with respect to the side sill upper panel for defining a space to receive the guide rail. In such conventional construction, a floor panel for constituting the floor of the vehicle compartment is necessarily located above the step plate with a certain vertical space therebetween. This results in relatively high elevation of the vehicle floor. Such a relatively high floor elevation reduces the riding space available for the passengers and also decreases the size of the door opening for the passengers to get in and out of the vehicle.

In view of these drawbacks in the prior art, it would be desirable to provide a sliding door guide rail installation structure which allows the vehicle floor panel to be placed at a relatively low elevation thereby permitting lowering of the vehicle floor.

SUMMARY OF THE INVENTION

Therefore, it is an object of the present invention to provide a guide rail structure for an automotive sliding door, which does not require any extra elevational space for installing and thus allows lowering the vehicle floor elevation.

Another object of the present invention is to provide a structure for installing a lower guide rail for an automotive sliding door onto a vehicle side sill along the side surface thereof.

It is also an object of the present invention to provide a structure for installing a guide rail on a vehicle side sill which serves to reinforce the side sill.

A further object of the present invention is to provide an installation structure for a vehicle sliding door guide rail onto a side sill with a reinforcement, which is particularly applicable for a vehicle having no center-pillar.

To accomplish the foregoing and other objects, a guide rail structure, according to the present invention, comprises a vehicle frame member with a step formed on the outer side surface thereof and a guide rail fixedly mounted on the step and extending essentially along the frame member. The frame member defines an internal space therein to receive the end portion of the guide rail. A reinforcement member is disposed within the internal space of the frame member for reinforcing the frame member. The end of the guide rail is fixed to the reinforcement member for cooperatively reinforcing the vehicle frame construction.

According to one embodiment of the present invention, a guide rail structure for a sliding door of an automotive vehicle comprises a vehicle body side frame extending along a vehicle side portion and having hollow cross-section defining a space therein, a guide rail engageable with a roller installed on the sliding door and mounted on the side frame, the guide rail having an end portion bent inwardly and inserted into the internal space of the side frame, and a reinforcement provided within the side frame and adapted to support the end portion of the guide rail, the reinforcement being secured to the frame and having a reinforcement surface on which the end portion of the guide rail is mounted.

BRIEF DESCRIPTION OF THE DRAWINGS

The present invention will be described more fully with reference to the accompanying drawings of a preferred embodiment of the invention, which, however, should not be taken as limiting the invention but are for elucidation and explanation only.

In the drawings.

DETAILED DESCRIPTION OF A PREFERRED EMBODIMENT

Figure 1:
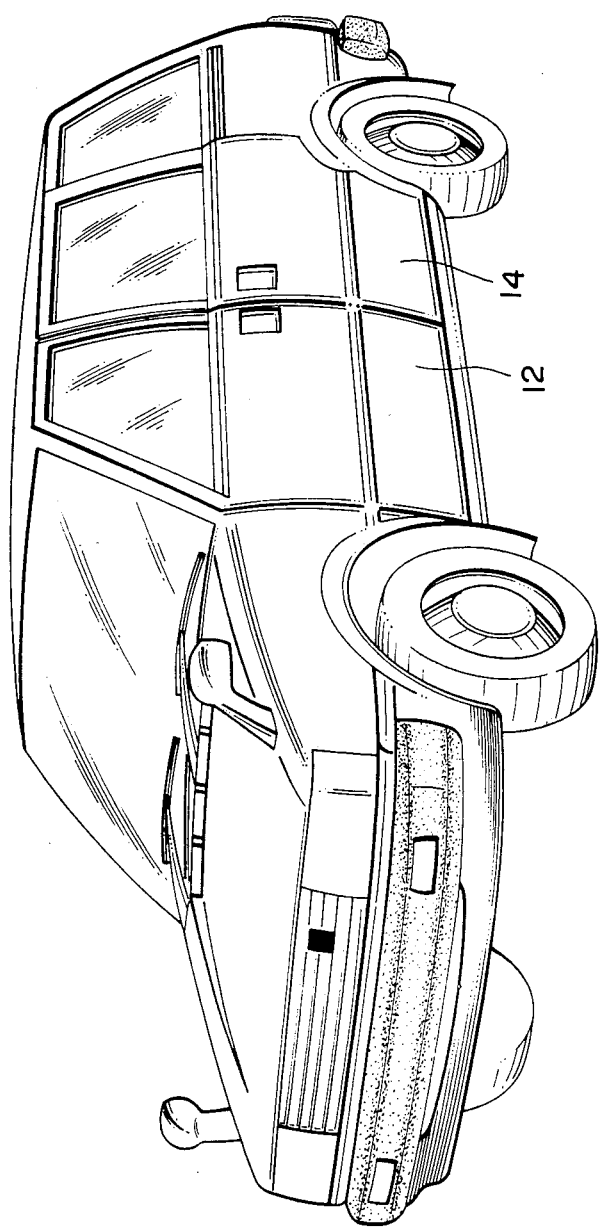
FIG. 1 is a perspective view of an automotive vehicle having a sliding door with a preferred embodiment of a guide rail structure according to the present invention.
Figure 2:
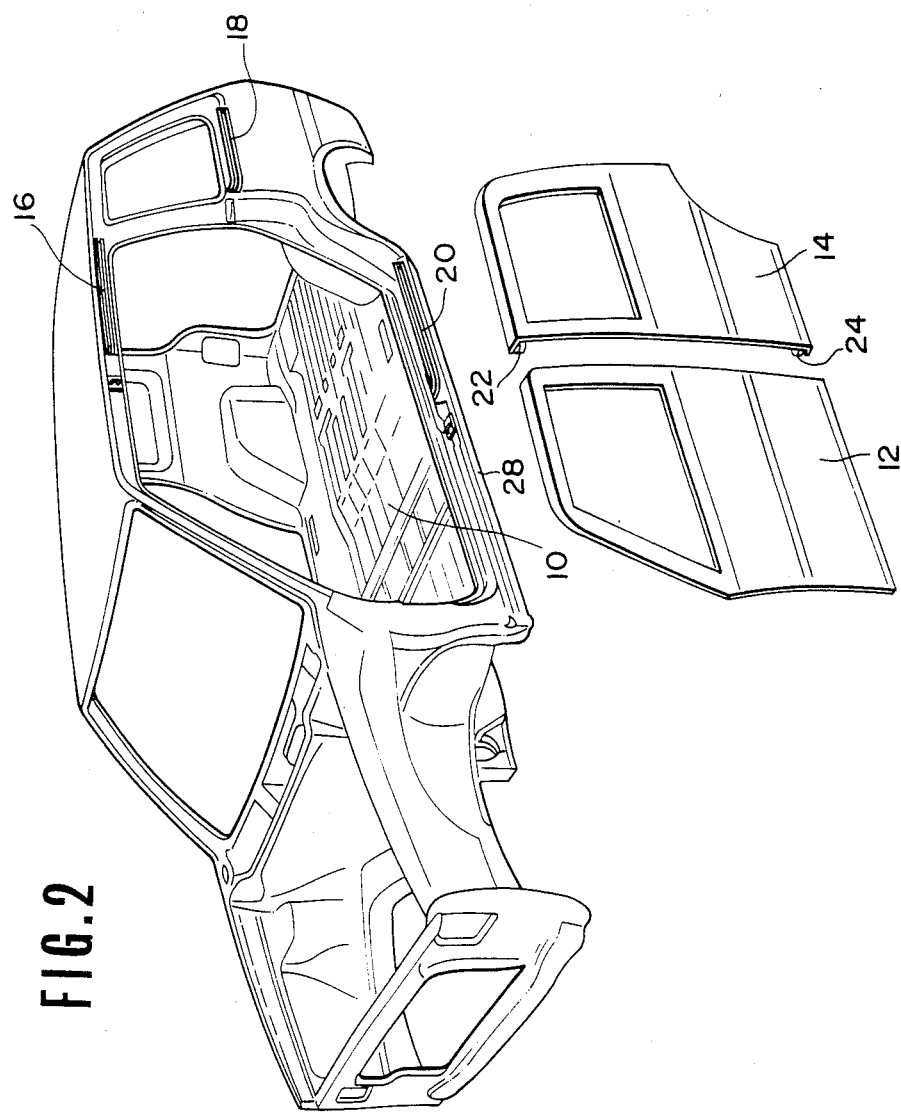
FIG. 2 is a perspective view of the vehicle of FIG. 1 showing the vehicle doors exploded from the door opening.
Figure 3:
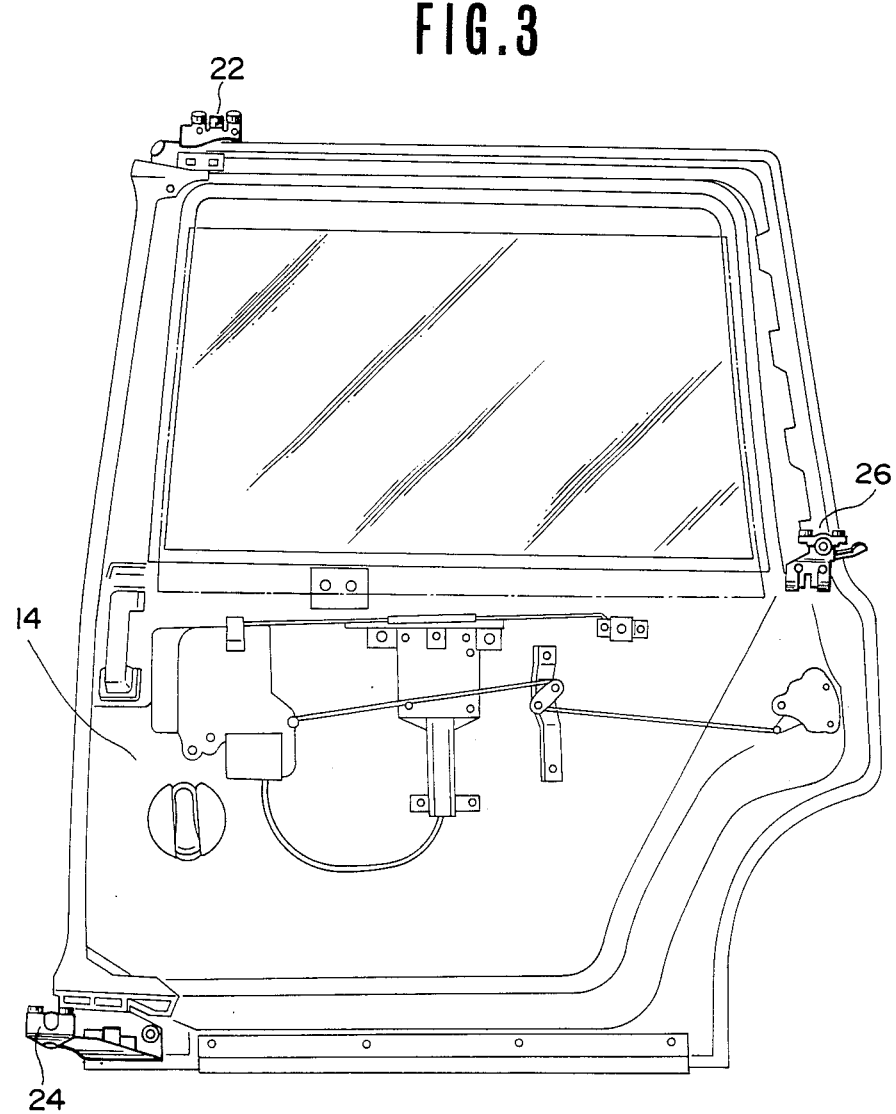
FIG. 3 is a rear elevation of the sliding door of FIG. 1.

Referring now to the drawings, particularly to FIGS. 1 and 2 an automotive vehicle of a type which has no center-pillar is illustrated with the preferred embodiment of a guide rail structure for a sliding door according to the present invention. As the illustrated vehicle has no center-pillar, a single door opening 10 is formed on each side of the vehicle body. A front swing door 12 is pivoted to the front essentially vertical edge of the door opening 10 at the front side edge thereof in a per se well known manner for opening and closing approximately the front half of the door opening in swing movement about a pivot. A rear sliding door 14 for slidingly opening and closing the rear half of the door opening 10 is hung with an upper guide rail 16, a waist guide rail 18 and a lower guide rail 20. Sliding door 14 is provided with upper rollers 22 adjacent the upper front corner, lower rollers 24 adjacent the lower front corner, and waist rollers 26 adjacent the rear edge thereof, as shown in FIG. 3.

Figure 4:
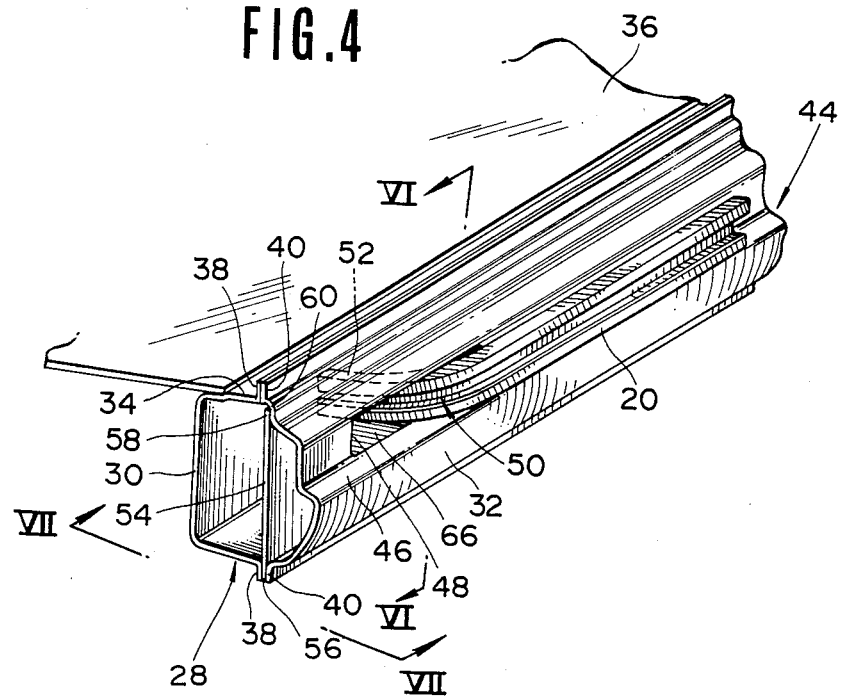
FIG. 4 is an enlarged perspective view of the lower portion of the vehicle of FIG. 1, showing the guide rail structure.
Figure 5:
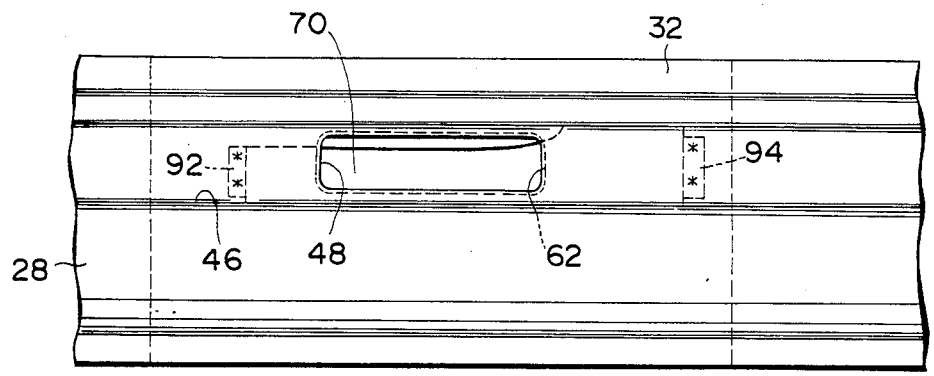
FIG. 5 is a front elevation of the side sill member of the structure of FIG. 4.

The lower guide rail 20 extends along a side sill 28. As shown in FIG. 4, the side sill 28 comprises a sill inner member 30 and a sill outer member 32. The sill inner member 30 is formed into essentially C-shaped crosssectional configuration. On the substantially horizontal upper section 34 of sill inner member 30, a lateral side edge of a floor panel 36 is fixedly mounted. The sill inner member 30 has upper and lower flanges 38 mating with upper and lower flanges 40 of the sill outer member 32. The mating flanges 38 and 40 are secured by spot welding or the like to define a closed cross section in the side sill 28.

As shown in FIG. 4, the sill outer member 32 is formed to have a step 44 with a horizontal plane 46 on which the lower guide rail 20 is fixedly mounted. Lower guide rail 20 is of substantially channel-shaped configuration for engagement with the lower rollers 24 of the sliding door. The sill outer member 32 is formed with a substantially rectangular opening 48. The lower guide rail 20 is bent towards the rectangular opening at a portion 50 adjacent to the rectangular opening 48. The end portion 52 of the lower guide rail 20 is thus inserted into the inside of the closed section defined in the side sill 28.

Figure 6:
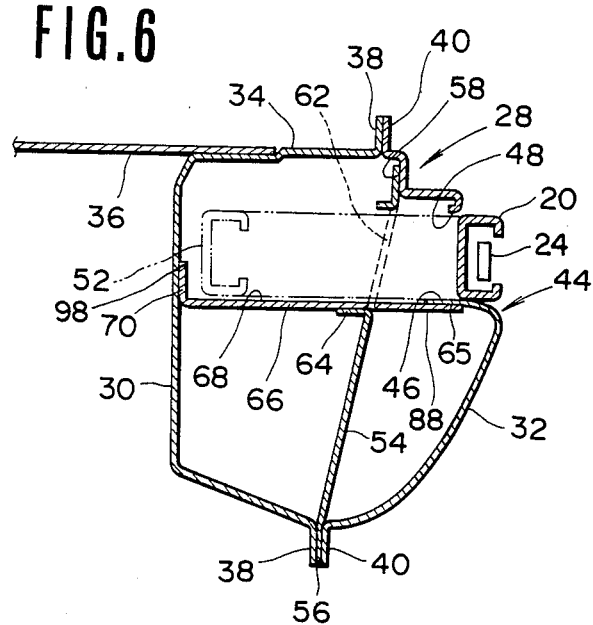
FIG. 6 is a cross section taken along line VI—VI of FIG. 4.
Figure 7:
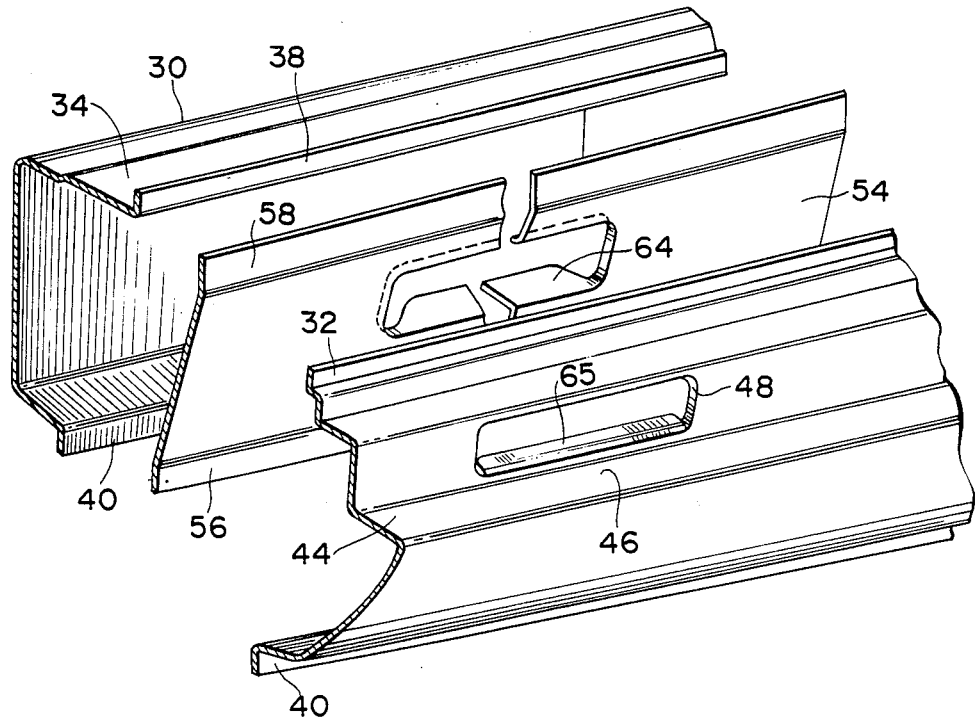
FIG. 7 is an enlarged and exploded perspective view of a side sill constituting part of the preferred embodiment of the guide rail structure.

As particularly shown in FIGS. 6 and 7, an essentially vertical reinforcement member 54 is inserted in the closed section of the side sill 28. The vertical reinforcement member 54 is inserted between the lower flanges 38 and 40 of the sill inner and outer members 30 and 32 at the lower edge 56. The upper edge 58 of the vertical reinforcement member 54 is secured to the vertical section 60 of the sill outer member 32. At the portion corresponding to the rectangular opening 48 of the sill outer member 32, the vertical reinforcement member 54 is also provided with a substantially rectangular opening 62 through which the end portion 52 of the lower guide rail 20 extends. A flange 64 is extended from the circumferential edge of the rectangular opening 62 of the vertical reinforcement member 54. Likewise, a flange 65 extends towards inside of the closed section of the side sill from the lower lateral edge of the rectangular opening 48.

Figure 8:
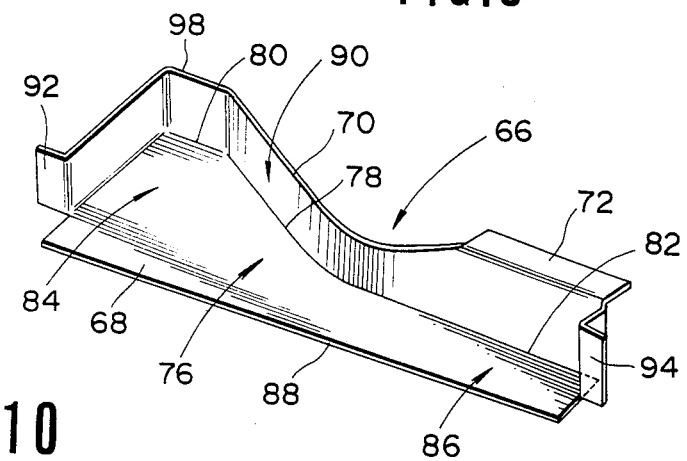
FIG. 8 is a perspective view of a horizontal reinforcement member for the side sill of FIG. 7.
Figure 9:
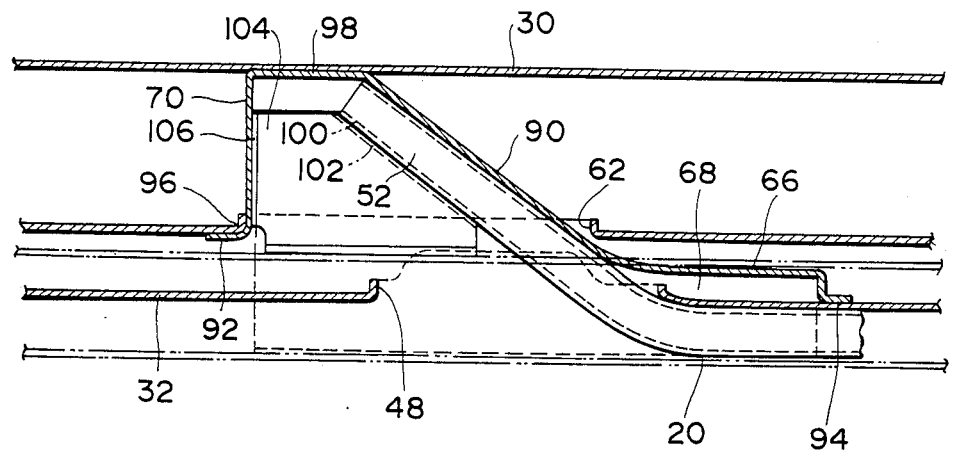
FIG. 9 is a horizontal section taken along line IX—IX of FIG. 4.

A horizontal reinforcement member 66 is inserted in the internal space of the side sill 28. Guide rail 20 can be mounted to member 66. As shown in FIG. 8, the horizontal reinforcement member 66 has a substantially horizontal major portion 68 and a vertical wall portion 70 which extends from the inner edge of horizontal portion 68. The vertical wall portion 70 is formed with a flange 72 extending laterally from the top thereof. Horizontal portion 68 has a section 76 which has a inner edge 78 oblique to the rear edges 80 and 82 of sections 84 and 86, which edges 80 and 82 are substantially parallel to the outer edge 88. The angular orientation of inner edge 78 is determined to fit the corresponding section 90 of the vertical wall 70 to the end portion 52 of the guide rail 50, as shown in FIG. 9. The end sections of vertical wall 70 are bent to form flanges 92 and 94. Flange 92 is adapted to be fixed to the vertical circumferential edge 96 of the rectangular opening 62 of the vertical reinforcement member 54. On the other hand, flange 94 is adapted to be fixed to the inner surface of the sill outer member 32.

As shown in FIG. 6, the front edge 88 of horizontal portion 68 is fixed to the lower surface of the flange 65 extending from the lower edge of the rectangular opening 48 in the sill outer member 32. Horizontal portion 68 is also fixed to the upper surface of the flange 64 extending from the lower edge of rectangular opening 62 in vertical reinforcement member 54. Section 98 of vertical wall portion 70 corresponding to the section 84 is fixed to the inner surface of the sill inner member 30.

Figure 10:
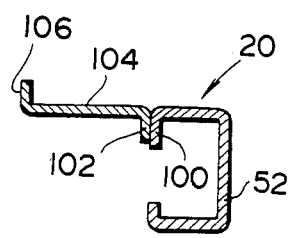
FIG. 10 is a section taken along line X—X of FIG. 9.

As shown in FIG. 9, the inner wall of end portion 52 of the guide rail 50 is fixed to the outer surface section 90 of the vertical wall portion 70 of horizontal reinforcement member 66. On the other hand, as shown in FIGS. 9 and 10, section 100 of end portion 52 of guide rail 50 is fitted to a flange 102 of a rail bracket 104. The rail bracket 104 has another flange 106 which is fixed to the vertical wall of horizontal reinforcement member 66.

The respective parts of the guide rail structure of the present invention may be fixed to each other by any suitable technique. A preferred technique is spot welding.

As described above in conjunction with the preferred embodiment, the lower guide rail for the sliding door is received in the side sill to allow the elevation of the vehicle floor to be lowered to increase riding convenience and convenience in getting in and out. Furthermore, with the construction set forth, the end portion of the guide rail inserted into the interior of the side sill itself serves as a lateral reinforcement in co-operation with the reinforcement members. This assists in providing sufficient stiffness for the vehicle side construction, and helps to compensate for decreases in strength which may result from omission of the center-pillar. Bending stress resistance is thereby increased. The portion of the guide rail extending horizontally along the sill similarly serves to increase the longitudinal reinforcement of the side sill against bending. Thus the guide rail structure of the present invention is considered particularly suitable for a center-pillarless vehicle.

If desired both the front and rear ends of the guide rail may be inserted into the interior of the side sill to provide additional reinforcement for the side sill. However, in a vehicle with a sliding rear door the need for additional reinforcement at the rear of the side sill is generally less than at the middle portion of the side sill.

While the present invention has been described in detail in terms of the preferred embodiment, the invention should not be understood as to be limited to the specific embodiment illustrated. Modifications of the illustrated embodiment incorporating the spirit and substance of the present invention may occur to persons skilled in the art. For example, though the illustrated embodiment is used in a vehicle having no center-pillar, it is of course possible to use the present invention on any vehicle having a sliding door with a lower guide rail, regardless of the presence or absence of the center pillar. Further, it may be possible to omit one of the vertical and horizontal reinforcement members. Accordingly, the scope of the invention should be limited solely by the appended claims and equivalents.

What is claimed is:

1. A guide rail structure for an automotive sliding door comprising:

a vehicle body side sill extending along a vehicle side portion and having inner and outer members defining a hollow cross-section with an internal space therein;

a guide rail engageable with a roller installed on the sliding door, said guide rail being mounted on said side sill, said guide rail having an end portion bent inwardly and inserted into said internal space of said side sill; and a reinforcement inserted within said side sill and adapted to support said end portion of said guide rail, said reinforcement secured to said sill and having a reinforcement surface on which said end portion of said guide rail is mounted;

wherein said side sill is formed with a guide rail rest extending substantially parallel to the longitudinal axis of said side sill, said guide rail mounted on said guide rail rest at a portion extending substantially parallel to said sill;

wherein said side sill is formed with an opening through which said end portion of said guide rail is inserted into said internal space; and wherein said reinforcement comprises an essentially vertical first member and an essentially horizontal second member, said first member being fixedly secured to said side sill at upper and lower ends thereof and said second member being mounted on said first member and secured to said side sill at both inner and outer ends thereof, said second member defining said reinforcement surface for supporting said guide rail.

2. A support structure for a guide rail for an automotive sliding door comprising:
- a vehicle body side sill having inner and outer members defining a hollow cross section with an internal space therein, said side sill having a step on the outer periphery thereof;
- a guide rail engageable with a roller member of the sliding door for guiding sliding movement of said sliding door, said guide rail having a major portion mounted on said step of said side sill and extending therealong and an inwardly bent end inserted into said internal space of said side sill; and
- a reinforcement disposed within said internal space of said side sill and fixed to said sill, said reinforcement defining an essentially horizontal support plane for mounting thereon said bent end of said guide rail, wherein said bent end of said guide rail extends across said internal space of said side frame and is fixed onto said support plane of said reinforcement, said bent end serving as a lateral reinforcement for said side sill;

wherein said major portion of said guide rail is fixed onto said step and serves as a reinforcement for increasing the stress bearing capacity of said side sill; and wherein said reinforcement comprises an essentially vertical first member secured to said side sill at upper and lower ends thereof and an essentially horizontal second member supported at an intermediate portion thereof by said first member and secured to said side sill at both inner and outer edges thereof.

3. A structure as set forth in claim 2, wherein said first and second members are arranged to have an essentially T-shaped cross section at the portion mounting said guide rail for supporting said bent end of said guide rail and reinforcing said side sill against bending.

4. A reinforcement structure for a vehicle body side frame for an automotive vehicle with a center-pillarless vehicle body and a sliding door, comprising:
- a vehicle body side sill extending along the lateral side of said vehicle body, said side sill having inner and outer members defining a hollow cross-section with an internal space therein;
- a guide rail having a first section extending substantially along said side sill and a second section inserted into said internal space of said side sill and extending across said internal space; and
- a guide rail support disposed within said internal space of said side wall and having a support plane for mounting thereon said second section of said guide rail;

wherein said first section of said guide rail serves as longitudinal reinforcement for said side sill against bending and said second section of said guide rail in cooperation with said guide rail support serves as lateral reinforcement for increasing the bending stress resisting capacity of said side sill;

wherein said side sill is formed with a guide rail rest for mounting said first section of said guide rail on the outer periphery of said side sill; and wherein said guide rail support has a substantially T-shaped cross-section at the portion supporting said second section of said guide rail, and each end of said T-shaped guide rail support is fixed to said side sill.

* * * * *